Figure 2:
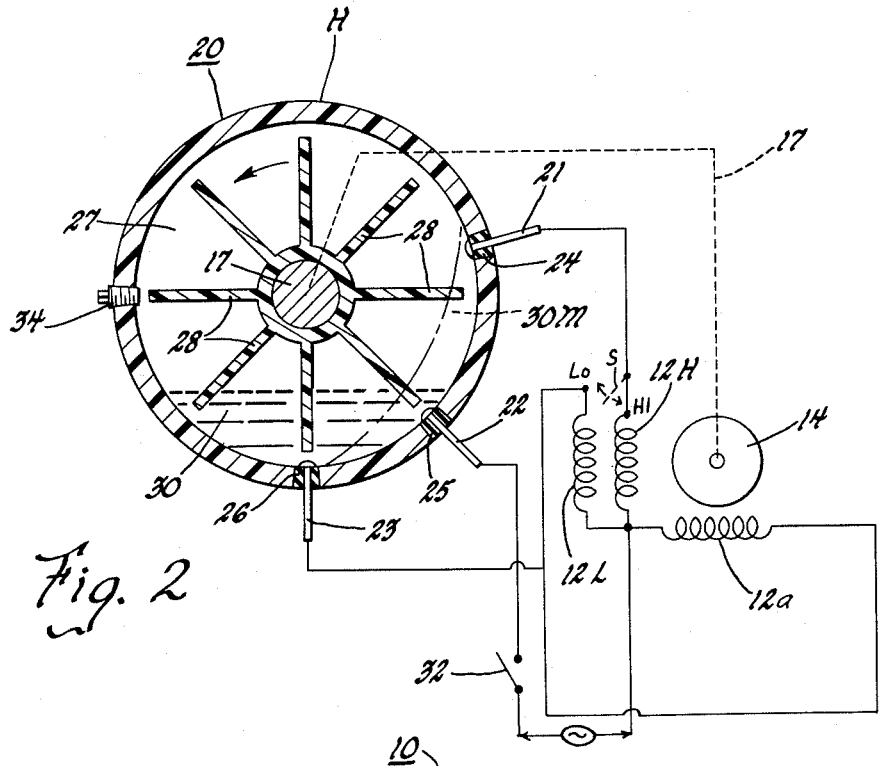

July 6, 1965  G. A. NEYHOUSE  3,193,746

CONDUCTING FLUID CENTRIFUGAL SWITCH FOR DYNAMOELECTRIC MACHINE

Filed April 17, 1961

INVENTOR.
George A. Neyhouse
BY
Albert H. Reuther
HIS ATTORNEY

United States Patent Office 3,193,746
Patented July 6, 1965

3,193,746
CONDUCTING FLUID CENTRIFUGAL SWITCH FOR DYNAMOELECTRIC MACHINE
George A. Neyhouse, Dayton, Ohio, assignor to General Motors Corporation, Detroit, Mich., a corporation of Delaware
Filed Apr. 17, 1961, Ser. No. 103,614
3 Claims. (Cl. 318—225)

This invention relates to multi-speed dynamoelectric machines, and more particularly, to centrifugal switching means having only fixed terminal means adapted to be used for establishing multi-speed winding connection of a dynamoelectric machine.

An object of this invention is to provide a new and improved dynamoelectric machine switch means having a minimum number of moving parts yet centrifugally responsive to speed of a dynamoelectric machine rotor for predetermined speed switching relative only to fixed terminal means.

Another object of this invention is to provide a dynamoelectric machine switch means including a rotatable member inside a fixed housing that is attached to the machine and that contains a conducting fluid such as mercury sealed therein subject to agitation by a blade means on the rotatable member such that the conducting fluid becomes arcuately distributed only along an inner periphery of the fixed housing for bridging of at least a pair of fixed terminals or contacts provided in peripheral locations along the fixed housing.

Another object of this invention is to provide a multi-speed centrifugal mercury switch means including only impeller blade means carried by a shaft-like rotatable member which extends axially into one side of an annular housing having a conducting fluid in a lower portion thereof and displaceable by blade means to establish electrical interconnection between at least a pair of fixed terminal means carried in sealed and insulated relation to a lower quadrant of the housing.

A further object of this invention is to provide a sealed switch means including a plurality of radially extending blade means carried by a shaft-like rotatable member which extends axially to one side of a housing having an annular inner chamber containing a conducting fluid medium such as mercury and the like in a lower portion thereof traversible by the blade means which can displace the fluid medium arcuately along an inner periphery of a lower quadrant of the housing where terminal-like fixed contacts project to be interconnected by the fluid medium under dynamic urging of the blade means which define a diameter less than that of the inner periphery of the housing and spaced from the fixed contacts which can be bridged only by the fluid medium.

Another object of this invention is to provide in combination a dynamoelectric machine having a multi-speed stator winding and rotor joined thereto with a shaft extension on which radially outwardly extending blade means can be carried to displace a conducting fluid medium from a pool condition within a cavity of a housing fixed to one side of a dynamoelectric machine frame, the housing having at least three terminal-like contact means fixed thereto and insulated to establish energization of at least two main winding portions of the multi-speed stator winding to which power is supplied by way of fluid medium displaced by the blade means in proportion to rotor shaft speed of the dynamoelectric machine.

Further objects and advantages of the present invention will be apparent from the following description, reference being had to the drawings wherein a preferred embodiment of the present invention is clearly shown.

Figure 1:
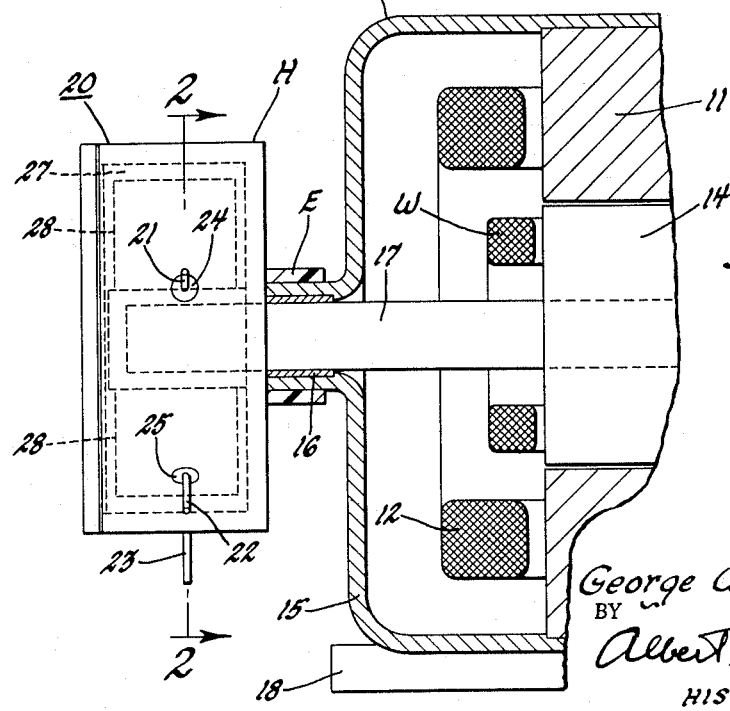

In the drawings:
FIGURE 1 shows a dynamoelectric machine switching means in elevation in accordance with the present invention.

FIGURE 2 is a cross-sectional elevational view of the switch means of FIGURE 1 together with circuit connection to a multi-speed dynamoelectric machine winding means.

FIGURE 1 shows part of a dynamoelectric machine generally indicated by numeral 10 including a stator 11 having windings 12 fitted thereto. These stator windings 12 can be wound coils connectable relative to each other for purposes of multi-speed operation when energized with respect to a rotor 14 having a squirrel cage or wire winding thereon. The dynamoelectric machine 10 includes a fixed casing or stationary housing 15 provided with bearings 16 for journalling of a shaft 17 that carries the rotor 14 having windings W thereon. A base 18 can support the housing 15 of the dynamoelectric machine 10 in a well-known manner and axially to one side of the housing 15 there is a switch casing or housing H carried by an extension E located radially outside the bearings 16 of the dynamoelecetric machine.

The switch housing H forms part of a multi-speed dynamoelectric machine switching means generally indicated by numeral 20. The switching means includes a plurality of fixed terminal means 21, 22 and 23 which are mounted relative to the housing H in sealed and insulated relation thereto as provided by annular bushings 24, 25 and 26 of insulating material located around terminal means 21, 22, and 23, respectively. A cavity or hollow interior 27 inside the housing H of the switch means 20 can have a diameter greater than external diameter of blade means 28 carried by an annular hub 29 and integral therewith. The blade means 28 and hub 29 can be press fitted or otherwise secured to an axially extending end of the shaft 17 which terminates inside the switch housing H. A fluid conducting medium 30 is located in a pool in a major portion of the lower half of the space or cavity 27 inside the switch housing H. This pool of conducting fluid medium or mercury and the like is adapted to establish initial interconnection of terminals 22 and 23 such that a low speed winding 12L of the stator windings 12 of dynamoelectric machine 10 can be energized simultaneously with a phase or auxiliary winding 12a to effect rotation of the rotor 14. Suitable wiring or connections can be provided between the terminal means 23 and the low speed winding 12L as well as the auxiliary winding 12a. A source of power can be connected by suitable leads directly to the auxiliary winding 12a and by way of an on-off switch 32 relative to the fixed terminal means 22.

In response to energization of the low speed winding 12L, the rotor turns and the blade means 28 traverse a circular path so as to displace the fluid medium 30 dynamically and spread the same arcuately along an inner periphery of the switch housing H. At a predetermined speed of operation the fluid medium 30 will be displaced as indicated or outlined by a reference numeral 30M and thus interconnection of terminal means 21 and 22 can be effected. Interconnection of terminal means 21 and 22 results in energization of a high speed winding portion 12H of the stator windings 12 and the dynamoelectric machine continues to operate at a higher speed.

The blade means 28 as mounted on the hub 29 and integral therewith can provide a rotatable member moved in proportion to rotor shaft speed so as to effect displacement of the conducting fluid medium 30. This conducting fluid or mercury is sealed within the space or cavity 27 subject to agitation by the radially outwardly projecting blade means and the conducting fluid becomes arcuately distributed only along an inner periphery of the fixed switch housing H for bridging at least a pair of fixed terminals or contacts provided in peripheral locations substantially radially in alignment with the blades though spaced therefrom along the fixed switch housing H. It is to be understood that 3, 4, 5 as well as more terminal means can be provided dependent upon the particular multi-speed dynamoelectric machine on which switch means 20 in accordance with the present invention is provided in combination. The conducting fluid medium such as mercury returns to a pool position when the dynamoelectric machine is de-energized and interconnection of terminal means 22 and 23 results in conditioning the machine for starting operation.

It is to be understood that the switch means 20 in accordance with the present invention can be used on other types of multi-speed dynamoelectric machines. For example, it is possible to use such switch means with a minimum number of movable parts for a multi-speed dynamoelectric machine disclosed by Patent 2,269,069-Werner issued January 6, 1942, to include split phase winding arrangement as well as a speed selector switch 60 therein that can be included herewith as indicated by a letter S in FIGURE 2. This switch can effect more positive high and low speed main winding connection for operation in a well-known manner. Also, it is possible to use the subject switch means 20 on a multi-speed winding of a dynamoelectric machine as disclosed by a copending application S. N. 804,374-Neyhouse, et al. filed April 6, 1959, now U.S. Patent 2,989,654-Neyhouse et al. issued June 20, 1961, and belonging to the assignee of the present invention. Another example of a dynamoelectric machine on which switch means in accordance with the present invention could be used can be seen in Patent 2,564,633-Ziegler issued August 14, 1951.

It is noted that an access plug can be threaded to the switch housing H for filing or servicing of conducting fluid 30 relative to the housing. Such a plug is indicated by reference numeral 34 in FIGURE 2 of the drawings. Also, it is to be noted that the switch housing H can be press fitted to the end frame 15 of the dynamoelectric machine and that suitable seals can be provided where the switch housing and end frames are joined. Suitable clamps can be provided if necessary to assure positive fixed mounting of the switch housing H relative to the dynamoelectric machine.

It is further noted that the dynamoelectric machine as illustrated in the drawings is mounted horizontally and the centrifugal switch means in accordance with the present invention is so located that fluid such as mercury in a pool can be displaced in response to agitation. It is to be understood that the housing for the switching means can be oriented in position as to the dynamoelectric machine to accommodate and compensate for any angular mounting of the dynamoelectric machine including even use of a vertical shaft position. The terminal means or electrodes have a particular relationship to each other in vertically separated planes regardless of the location of the axis of rotation of the impeller blades which agitate the fluid such as mercury. The principle of operation remains the same regardless of the motor mounting provided and fluid in the pool rises peripherally depending upon the agitator used and may change the configuration or location of the fluid such as mercury in the pool. Generally the level of the pool is decreased centrally and increased peripherally because displacement of the pool varies in accordance with degree of agitation provided. In any event, the amount of fluid displacement is a function of the amount of agitation which generally increases mutually. Thus, when it is noted that there is a proportional displacement of fluid in accordance with agitation, it is to be understood that such variation does not necessarily have to be a direct proportional relationship.

Further, it is to be noted that the switching means in accordance with the present invention can be used for single speed dynamoelectric machines as well as multi-speed machines. Also, the switching means can be utilized not only for motor control but also on gasoline pump and hermetic compressor installations as well as any installation where a particular speed responsive device is needed. Fluid such as mercury in a pool provides a compact and effective medium useful at low speeds as well as at high speeds without resorting to considerable bulk and size such as on weight type centrifugal switching devices. The switching means of the present invention as a speed responsive device can be used for polyphase dynamoelectric machine plugging switches where previously heavy duty and rugged types of switching equipment were required.

While the embodiment of the present invention as herein disclosed constitutes a preferred form, it is to be understood that other forms might be adopted.

What is claimed is as follows:

1. For use with a dynamoelectric machine having a multi-winding stator means and a rotor carried by a shaft journalled for rotation relative thereto as enclosed within a structural enclosure, the combination therewith comprising, a fixed housing carried axially of the machine enclosure and having a cavity-like space therein, a shaft extension projecting axially from said rotor shaft and extending into said space, a rotatable member including radially outwardly extending blade portions adapted to traverse an annular path in said cavity, a conducting fluid medium sealed within a part of said space and subject to agitation by said blade portion in response to movement of said blade portions in said annular path, and multiple terminal means insulated from each other as mounted to extend radially outwardly through said fixed housing at fixed predetermined locations totalling at least three in number including one intermediate terminal means for power supply and remaining terminal means located upwardly and downwardly therefrom such that at least pairs of terminal means can be bridged by said conducting fluid medium subject to displacement dependent upon rotor speed of said machine having the multi-winding stator means electrically partially energizable in response to bridging of said pairs of terminal means insulated from each other.

2. A sealed switch means, comprising a fixed housing having an annular cavity therein, a plurality of terminal means all having inner ends extending radially into the cavity, a conducting fluid medium contained in a lower half of the cavity, and impeller blade means journaled for movement inside the cavity in an arcuate path defining a diameter less than that of the cavity and spaced radially inwardly of all inner ends of said terminal means, said blade means upon movement effecting displacement of said conducting fluid medium which can bridge predetermined pairs of terminal means at all times, said terminal means being a total three in number including one for power supply in a location intermediate radially upwardly and downwardly projecting terminal means all of which are insulated and sealed with respect to said housing by annular members of elastomeric material.

3. A multi-speed centrifugal switch means having a minimum number of moving parts comprising, impeller blade means carried by a shaft-like rotatable member, a fixed housing having an annular hollow interior in which said blade means can move in an arcuate path, a conducting fluid medium provided in a pool along a lower periphery of the hollow interior of said fixed housing, and multiple terminal means insulated from each other as mounted to extend radially through said housing and at fixed predetermined locations, said blade means in movement in the arcuate path traversible thereby effecting displacement of the fluid medium from the pool always to interconnect predetermined terminal means in accordance with fluid medium displacement proportional to movement of said blade means, said terminal means totaling three in number of which at least two are located in a lower quadrant of said housing and one is located in an upper quadrant.

References Cited by the Examiner

UNITED STATES PATENTS

| | | | |
|---|---|---|---|
| 2,054,957 | 9/36 | Svenson | 200—80 |
| 2,334,611 | 11/43 | Darling | 200—152 |

ORIS L. RADER, *Primary Examiner.*

JOHN F. COUCH, *Examiner.*